(12) United States Patent
Rainsberger

(10) Patent No.: US 12,485,572 B2
(45) Date of Patent: Dec. 2, 2025

(54) CARPENTRY TOOL

(71) Applicant: CENTER STUD, LLC., Temperance, MI (US)

(72) Inventor: Harold Rainsberger, Temperance, MI (US)

(73) Assignee: CENTER STUD, LLC., Temperance, MI (US)

( * ) Notice: Subject to any disclaimer, the term of this patent is extended or adjusted under 35 U.S.C. 154(b) by 37 days.

(21) Appl. No.: 18/422,884

(22) Filed: Jan. 25, 2024

(65) Prior Publication Data

US 2024/0246257 A1     Jul. 25, 2024

Related U.S. Application Data

(60) Provisional application No. 63/481,427, filed on Jan. 25, 2023.

(51) Int. Cl.
| | |
|---|---|
| *G01B 3/10* | (2020.01) |
| *B27M 3/00* | (2006.01) |
| *E04G 21/18* | (2006.01) |
| *G01B 3/1071* | (2020.01) |
| *G01B 3/1084* | (2020.01) |

(52) U.S. Cl.
CPC ....... *B27M 3/0073* (2013.01); *E04G 21/1841* (2013.01); *G01B 3/1071* (2013.01); *G01B 3/1084* (2013.01)

(58) Field of Classification Search
CPC ............. B27M 3/0073; E04G 21/1841; G01B 3/1071; G01B 3/1084

USPC .................... 33/42, 613, 645, 759, 760, 770
See application file for complete search history.

(56) References Cited

U.S. PATENT DOCUMENTS

| | | | | | |
|---|---|---|---|---|---|
| 3,449,875 | A | * | 6/1969 | Snedeker | E04B 2/704 52/294 |
| 3,851,372 | A | * | 12/1974 | Wirch | B27F 5/02 52/745.2 |
| 4,212,108 | A | * | 7/1980 | Jackson | G01B 3/00 D10/64 |
| 4,756,133 | A | * | 7/1988 | Madray | E04C 3/09 52/127.2 |
| 5,197,195 | A | * | 3/1993 | Aikens | B25H 7/04 7/163 |
| 5,349,760 | A | * | 9/1994 | DeVito | B26B 11/00 30/294 |
| 5,628,119 | A | * | 5/1997 | Bingham | E04G 21/1891 269/904 |

(Continued)

*Primary Examiner* — George B Bennett
(74) *Attorney, Agent, or Firm* — Jacob M. Ward; Ward Law Office LLC

(57) ABSTRACT

Embodiments of the present disclosure may include a carpentry tool for wall framing, the carpentry tool configured for use with a plate, a stud having an end, a tape measure, a fastening tool, and a fastener, the carpentry tool including a first end, a second end, a top side, a bottom side, a first end with a first receiver, and a second end with a second receiver, the first receiver and the second receiver aligned along a first axis, the first receiver configured to receive the end of the stud and the second receiver configured to align the fastening tool and the fastener. Embodiments may also include a channel formed in the bottom side and aligned along a second axis, the second axis being orthogonal with the first axis, the channel configured to receive the plate.

20 Claims, 9 Drawing Sheets

(56) References Cited

U.S. PATENT DOCUMENTS

| | | | | |
|---|---|---|---|---|
| 5,782,007 | A * | 7/1998 | Harris | B26B 29/06 |
| | | | | 33/768 |
| 6,049,990 | A * | 4/2000 | Holland | B43L 7/02 |
| | | | | 33/468 |
| 6,260,283 | B1 * | 7/2001 | Abernathy | B43L 7/12 |
| | | | | 33/484 |
| 6,289,594 | B1 * | 9/2001 | Wrobbel | B43L 7/02 |
| | | | | 33/479 |
| 6,490,841 | B2 * | 12/2002 | Hynes | E04C 3/29 |
| | | | | 403/403 |
| 6,494,015 | B1 * | 12/2002 | Critchlow | E04F 21/00 |
| | | | | 269/1 |
| 7,659,479 | B2 * | 2/2010 | Murphy | H02G 3/123 |
| | | | | 33/528 |
| 7,681,324 | B2 * | 3/2010 | Hooks | E04B 7/022 |
| | | | | 33/562 |
| 8,020,312 | B1 * | 9/2011 | McGahan | B26B 29/06 |
| | | | | 30/294 |
| 9,212,882 | B2 * | 12/2015 | Brossard | G01B 3/004 |
| 9,903,696 | B2 * | 2/2018 | Stewart | G01B 3/1061 |
| 9,932,744 | B2 * | 4/2018 | Vandenberg | E04F 21/22 |
| 10,668,582 | B1 * | 6/2020 | Rogers | B23P 19/04 |
| 11,041,304 | B2 * | 6/2021 | Schettine | E04B 1/38 |
| 12,181,275 | B2 * | 12/2024 | Capon | G01B 3/1061 |
| 2002/0129511 | A1 * | 9/2002 | Laughlin | G01B 3/1071 |
| | | | | 33/770 |
| 2008/0250664 | A1 * | 10/2008 | Wise | G01B 3/1056 |
| | | | | 33/770 |
| 2011/0140331 | A1 * | 6/2011 | Masiongale | H02G 3/00 |
| | | | | 269/74 |
| 2018/0195300 | A1 * | 7/2018 | Gillespie | E04G 21/1891 |
| 2024/0084611 | A1 * | 3/2024 | Lewis | E04G 21/1841 |
| 2025/0290736 | A1 * | 9/2025 | Haase | G01B 5/0004 |

\* cited by examiner

CARPENTRY TOOL

CROSS-REFERENCE TO RELATED APPLICATIONS

This application claims the benefit of U.S. Provisional Application No. 63/481,427 filed on Jan. 25, 2023. The entire disclosure of the above application is incorporated herein by reference.

FIELD

The present technology includes articles of manufacture, systems, and processes that relate to carpentry tools for wall framing.

INTRODUCTION

This section provides background information related to the present disclosure which is not necessarily prior art.

Wall framing is a fundamental aspect of building construction, and may involve the assembly of structural elements to create the support and shape of walls. This process may typically require the precise placement and secure attachment of vertical studs to horizontal plates, forming the skeleton of a wall onto which other materials such as drywall or sheathing can be applied. Wall framing has been a manual and labor-intensive task, necessitating the use of basic hand tools such as hammers, nails, tape measures, and levels. Typically, a carpenter may measure and mark a placement of a stud, ensure proper alignment, and then fasten a stud to a plate. This may also occur while handling bulky and heavy materials. The accuracy of these steps may be critical to the structural integrity and quality of the finished construction.

Specialized tools may be designed to improve efficiency, and safety in wall framing. These tools may range from simple mechanical aids to more complex devices that incorporate features for measuring, aligning, and securing framing components. Innovations in this field aim to streamline the framing process, reduce the potential for errors, and minimize the physical strain on workers, thereby enhancing productivity and the overall quality of construction projects.

In particular, wall frames may be constructed using vertical plates and horizontal studs that may be fastened together into a well-supported frame. This may require fastening the studs to the plates at precise intervals, which means one must be able to concurrently measure along the plate, insert and hold a stud in place at a precise location, and then fasten the stud to the plate in the correct position. The longer the wall frame required, the more plates and studs must be fastened together to create a well-supported frame. If done manually, the steps of measuring and marking each plate, inserting each stud, and aligning each fastener can be extremely time consuming. The process is further prone to human error. Additionally, framing a wall when constructing a building is labor intensive and puts the hands of the carpenter at risk of injury from a power nailing device.

Accordingly, there is a continuing need for a carpentry tool for framing walls that optimizes the wall framing process, and which assists with accurate measurements, alignment, and fastening of materials.

SUMMARY

In concordance with the instant disclosure, a carpentry tool that optimizes the wall framing process by facilitating accurate measurements, alignment, and fastening of materials, has surprisingly been discovered.

The present technology may include a carpentry tool and ways of using a carpentry tool. In certain embodiments, a carpentry tool for wall framing may be configured for use with a plate, a stud having an end, a tape measure, a fastening tool, and a fastener. The carpentry tool may include a first end, a second end, a top side, a bottom side, a first side with a first receiver, and a second side with a second receiver. The first receiver and the second receiver may be aligned along a first axis. In certain embodiments, the first receiver may be configured to receive the end of the stud. The second receiver may be configured to align the fastening tool and the fastener. A channel may be formed in the bottom side of the carpentry tool and aligned along a second axis. The second axis may be orthogonal with the first axis. The channel may be further configured to receive the plate. The carpentry tool may also include a pair of holders disposed within the channel. For example, the pair of holders may be configured to hold the carpentry tool over the tape measure when the tape measure may be disposed on the plate and the plate may be received in the channel.

In certain embodiments, the carpentry tool may include an opening formed from the top side to the bottom side and between the first end and the second end. The opening may be configured to provide a view of a portion of the tape measure when the tape measure is disposed on the plate. The opening may include an opening width and the tape measure may have a tape measure width. The opening width may include a width greater than or equal to the tape measure width to permit a concurrent viewing of the tape measure and a portion of the plate adjacent to the tape measure through the opening when the tape measure is disposed on the plate and the plate is received in the channel.

The carpentry tool may include additional aspects. In certain embodiments, the carpentry tool may include an opening marker projecting into the opening at the top side of the carpentry tool to facilitate an alignment of the carpentry tool with a center of the stud with reference to the tape measure when the end of the stud is received in the first receiver. In certain embodiments, the first side and the second side of the carpentry tool may be adjustable to change a width of the channel to accommodate a variety of sizes of the plate. For example, the plate may include a 2×4 plate, a 2×6 plate, a 2×8 plate, and a 2×10 plate. In certain embodiments, the pair of holders may be configured to engage with the tape measure to prevent slippage during a fastening operation coupling the end of the stud with the plate. The second receiver may be configured to receive and guide a nail gun as the fastening tool during a fastening operation coupling the stud with the plate. In certain embodiments, the first receiver may include a stud retention mechanism to temporarily hold the stud in place during the fastening operation. The carpentry tool may further include a grip surface on the top side to facilitate handling of the carpentry tool.

In use, the first receiver and the second receiver of the carpentry tool may be configured to automatically align the fastener with the stud when the carpentry tool is positioned over the plate and the end of the stud is received in the first receiver. The carpentry tool may include a leveling device configured to indicate alignment of the plate relative to the stud during a fastening operation. The carpentry tool may include a measurement indicator along the first axis to provide visual guidance for placement of the end of the stud relative to the plate.

In certain embodiments, a method for wall framing using a carpentry tool may include providing a carpentry tool for wall framing, such as described herein, receiving an end of a stud in the second receive, receiving a plate in the channel, and performing a fastening operation coupling the end of the stud with the plate. In certain embodiments, prior to receiving the plate in the channel, a tape measure may be disposed on the plate. For example, the tape measure may be disposed on the plate and the carpentry tool may be positioned over the plate at a first predetermined location identified by the tape measure as viewed through an opening. In particular, the tape measure may be placed on the plate and the carpentry tool may be positioned over the plate at a first predetermined location as identified by the tape measure as viewed through an opening. After receiving the plate in the channel, the end of the stud may be disposed in the first receiver of the carpentry tool, and the fastening operation may be performed in order to fasten the stud to the plate with the fastener to form at least a portion of a wall frame.

Use of the carpentry tool may include additional aspects. For example, performing the fastening operation may include coupling the end of the stud with the plate by inserting the fastener into the second receiver of the carpentry tool. Methods may further include positioning the carpentry tool over the plate at a second predetermined location identified by the tape measure as viewed through an opening of the carpentry tool, inserting the fastener into the second receiver of the carpentry tool, disposing an end of a second stud in the first receiver of the carpentry tool, and performing the fastening operation, where the second stud is fastened to the plate with the fastener to form at least a second portion of the wall frame.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
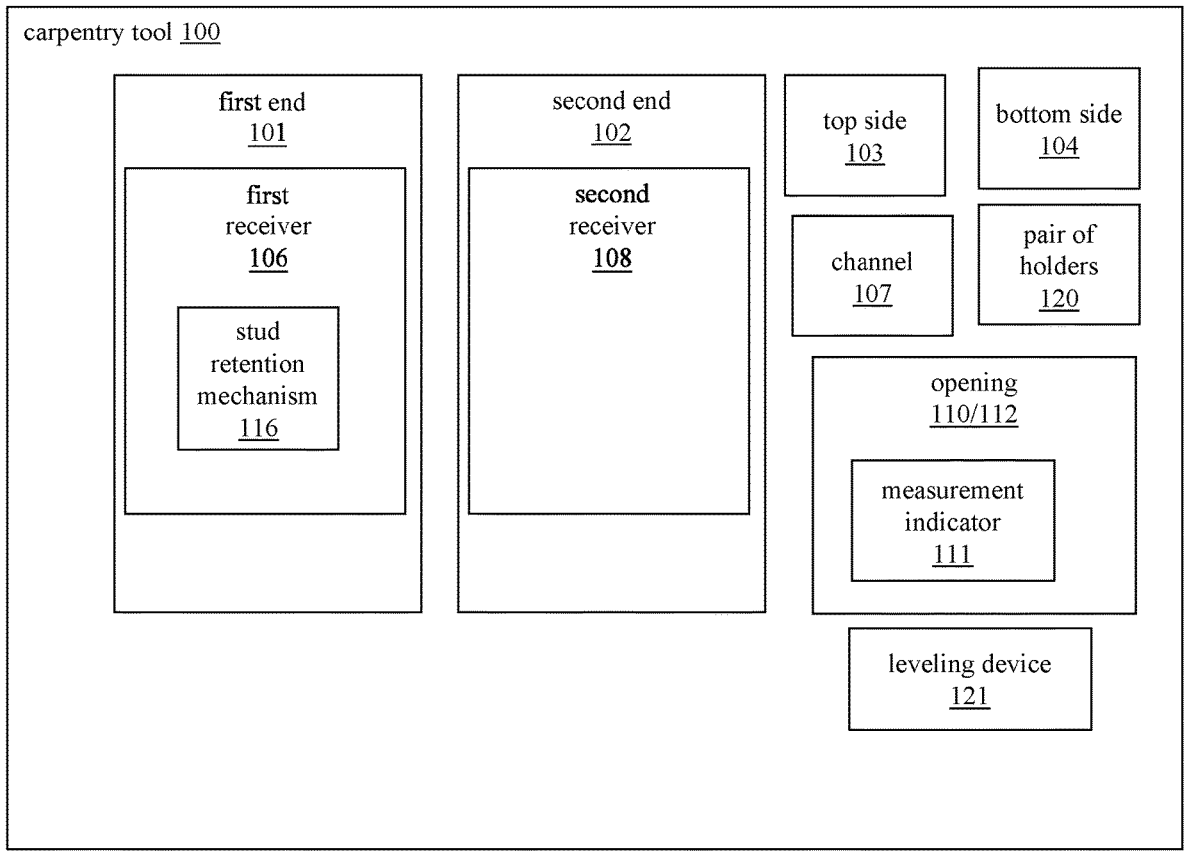
FIG. 1 is a block diagram illustrating aspects of a carpentry tool, according to an embodiment of the present disclosure.
Figure 2:
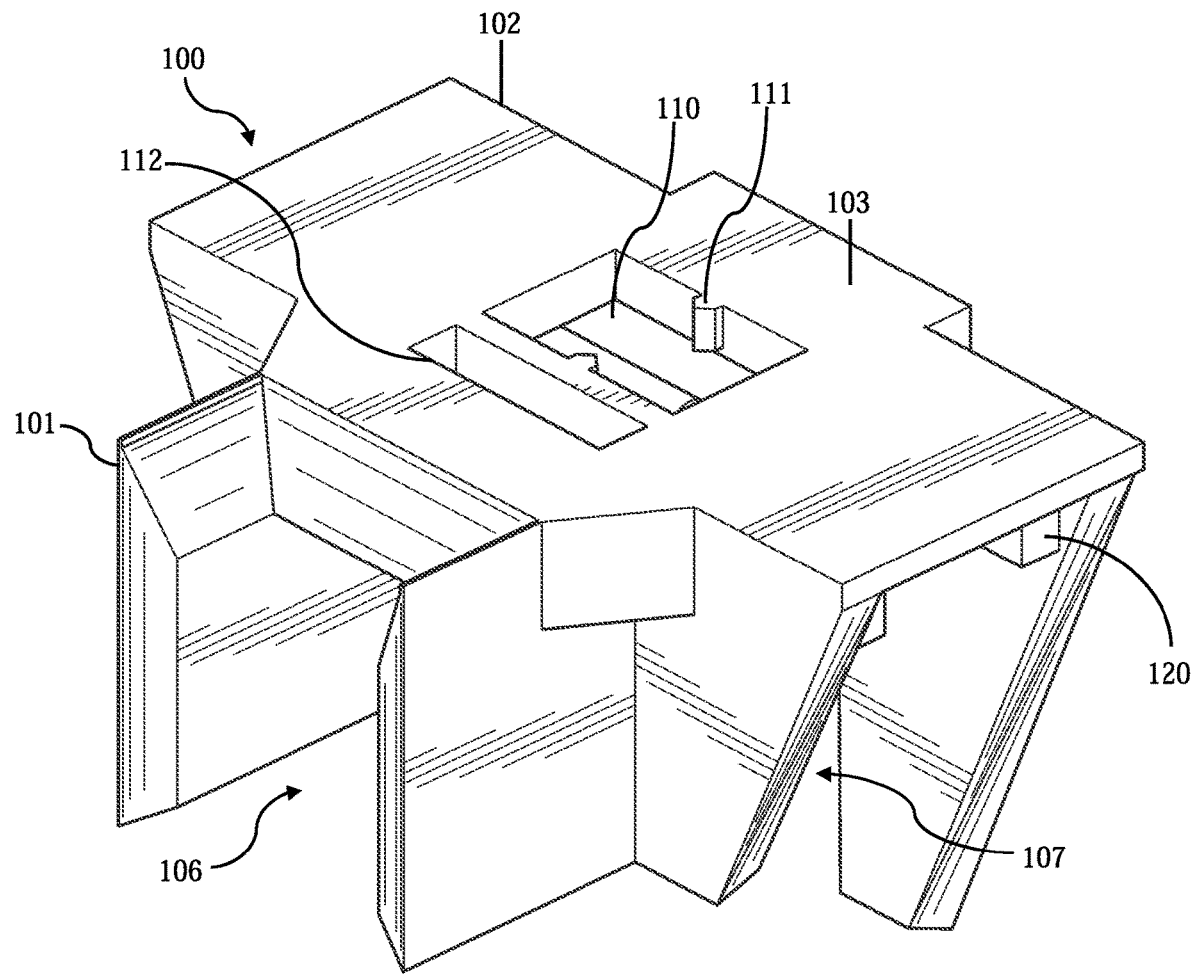
FIG. 2 is a top perspective view further illustrating a carpentry tool, according to an embodiment of the present disclosure.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides a carpentry tool and ways of using a carpentry tool associated with the framing of a wall. The carpentry tool allows one to concurrently measure along a plate, insert and hold a stud in place at a predetermined location, and fasten the stud to the plate at the predetermined location. The carpentry tool may be relocated and used to fasten subsequent studs to subsequent locations on the plate. The longer the wall frame required, the more plates and studs must be fastened together to create a particular frame design. The carpentry tool improves aspects of measuring and marking each plate, inserting each stud, and aligning each fastener. In this way, a rate of framing a wall can be increased and errors in measurement, alignment, and fastening operations may be minimized.

With reference to the accompanying drawings, aspects a carpentry tool 100 and use thereof are shown. The carpentry tool 100 may be configured for use with framing a wall, such as securing a plurality of studs 145 to a plate 140 (e.g., FIGS. 11-13) in order to frame the wall. In certain embodiments, the carpentry tool 100 may be configured for use with the plate 140, the stud 145, a tape measure 131, a fastener 151, and a fastening tool 150 configured to attach the fastener 151 to the stud 145 and the plate 140. In certain embodiments, the carpentry tool 100 may further include a first end 101, a second end 102, a top side 103, and a bottom side 104. The first end 101 may include a first receiver 106 and the second end 102 may include a second receiver 108.

Figure 3:
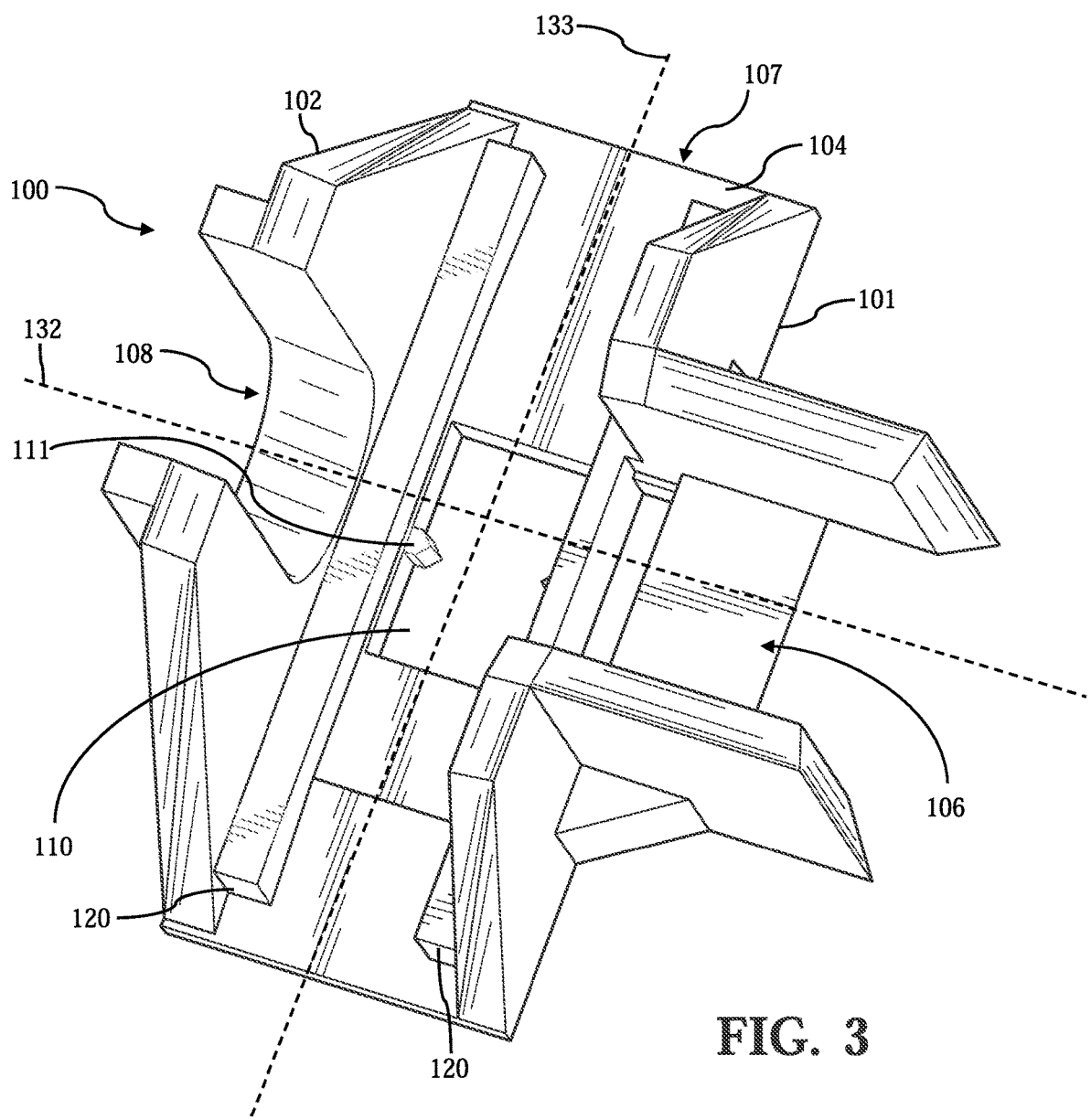
FIG. 3 is a bottom perspective view further illustrating the carpentry tool from FIG. 2.
Figure 4:
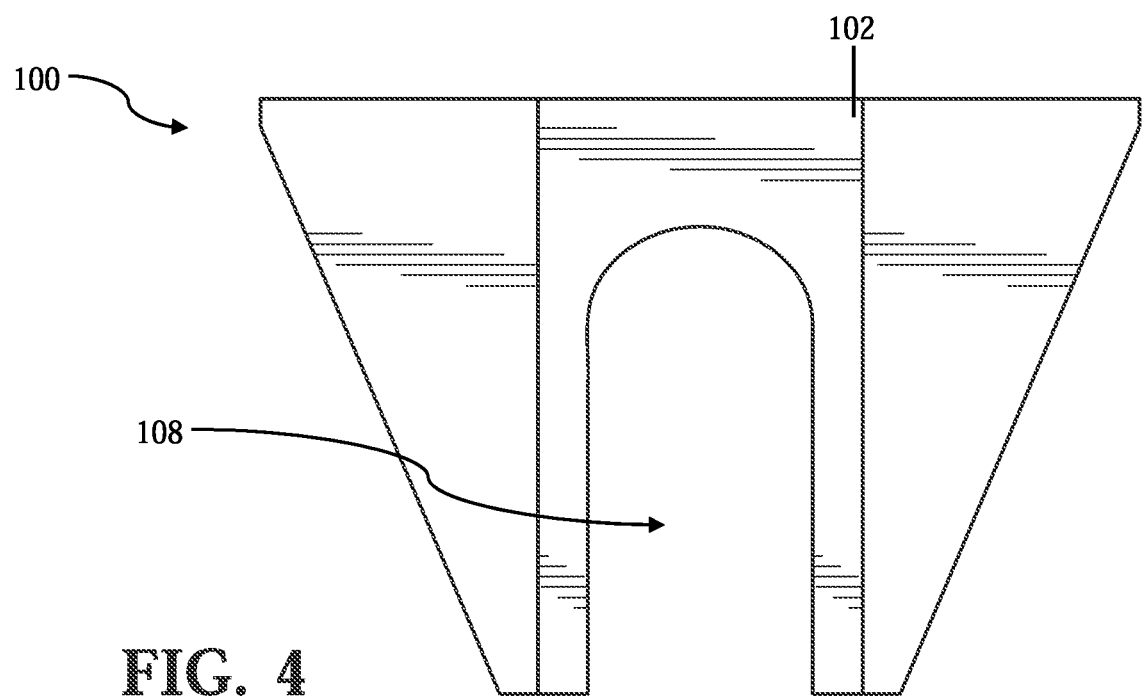
FIG. 4 is a second end elevation view illustrating the carpentry tool from FIG. 2.
Figure 5:
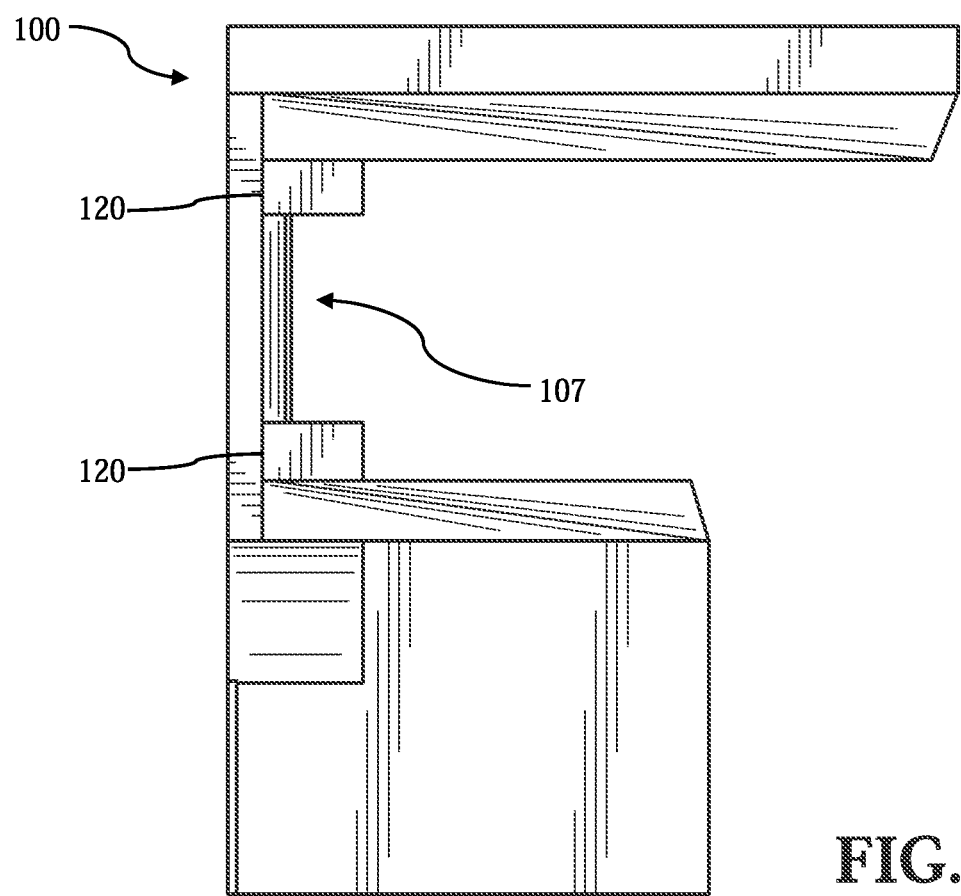
FIG. 5 is a side elevation view further illustrating the carpentry tool from FIG. 2.
Figure 6:
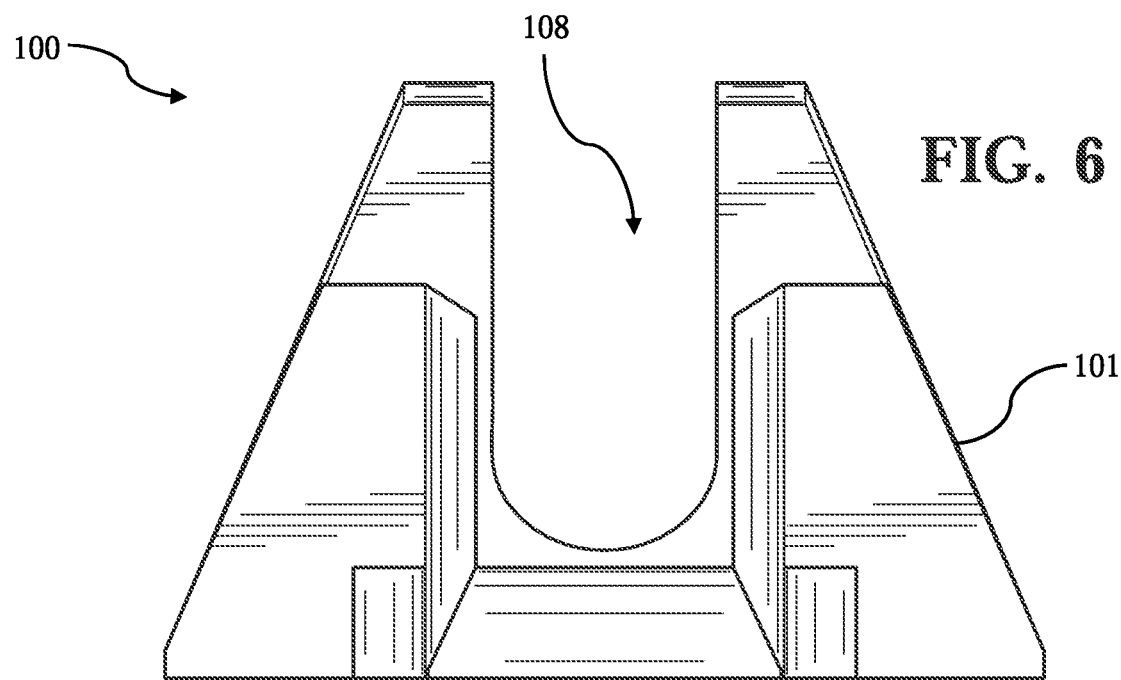
FIG. 6 is a first end elevation view illustrating the carpentry tool from FIG. 2ure.
Figure 7:
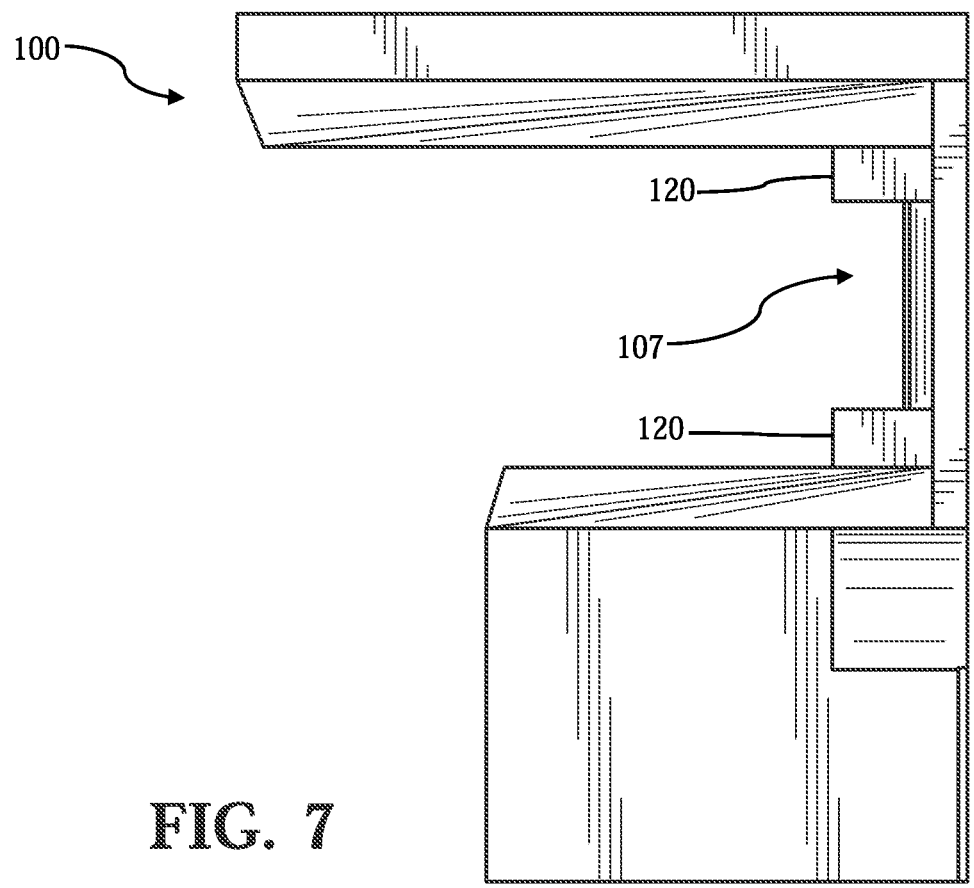
FIG. 7 is a side elevation view further illustrating the carpentry tool from FIG. 2.

As shown in FIG. 3, the first receiver 106 and the second receiver 108 may be aligned along a first axis 132. As further shown in FIGS. 9-12, the first receiver 106 may be configured to receive the end of the stud 145 and the second receiver 108 may be configured to align the fastening tool 150 and the fastener 151. A channel 107 formed in the bottom side 104 of the carpentry tool 100 may be aligned along a second axis 133. The second axis 133 may be orthogonal with the first axis 132 and be configured to receive the plate 140 in order to fasten or otherwise attach the stud 145 with the plate 140. In certain embodiments, such as particularly shown in FIGS. 11-13, the plate 140 may be fastened to a stud 145 using a nail gun or other appropriate device. In certain embodiments, the fastener 151 may include the nail delivered by the fastening tool 150. However, as will be apparent to someone of ordinary skill in the art, the stud 145 may be coupled to the plate 140 using any appropriately desired device. For example, in certain embodiments, the stud 145 may be fastened to the plate 140 using a screw or other type of fastener. Additionally, the stud 145 may be fastened to the plate 140 using a hammer or other appropriately desired tool.

In certain embodiments, a plurality of holders 120 may be disposed within the channel 107. The plurality of holders 120 may be configured to hold the carpentry tool 100 over the tape measure 131 when the tape measure 131 is disposed on the plate 140 and the plate 140 is received in the channel 107. An opening 110 may be formed from the top side 103 to the bottom side 104 and between the first end 101 and the second end 102. In certain embodiments, the opening 110 may be configured to provide a view of the tape measure 131 when the tape measure 131 is disposed on the plate 140. For example, the tape measure 131 may be used to align the stud 145 along the plate 140 to an appropriate location to assemble the framer using the carpentry tool 100.

The plate 140 may include a 2×4 plate, a 2×6 plate, a 2×8 plate, and a 2×10 plate. In particular, the plate 140 may include an appropriately desired size for framing a wall. In addition, the stud 145 may include any appropriately desired stud 145 for framing the wall. For example, in certain embodiments the stud may include a 2×4 stud 145 for framing the wall with the plate 140. In certain embodiments, the carpentry tool 100 may be adjustable to change a width of the channel 107 to accommodate the variety of sizes of the plate 140.

The opening 110 and 112 may include an opening width and the tape measure 131 may have a width. The width of the opening 110 and 112 may be greater than or equal to the tape measure 131 width to permit a concurrent viewing of the tape measure 131 and a portion of the plate 140 adjacent to the tape measure 131 through the opening 110 and 112 when the tape measure 131 is disposed on the plate 140 and the plate is received in the channel 107. The opening 110 may further comprise a marker 111 that may project into the opening 110 to facilitate an alignment of the carpentry tool 100 with a stud 145 and with reference to the tape measure 131 when the stud 145 may be received in the first receiver 106.

As shown in FIGS. 2-13, the second receiver 108 may be configured to receive and guide a fastening tool 150, such as nail gun during a fastening operation coupling the stud 145 with the plate 140. In certain embodiments, the first receiver 106 may include a stud retention mechanism 116 to temporarily hold the stud 145 in place during the fastening operation. The plurality of holders 120 may be configured to engage the tape measure 131 to prevent slippage during a fastening operation coupling the end of the stud 145 with the plate 140. The carpentry tool 100 may be formed from a material selected from a group consisting of metal, plastic, and composite materials. However, as would be apparent to someone of ordinary skill in the art, the carpentry tool 100 may be formed of any appropriately desired material. Additionally, in certain embodiments, the carpentry tool 100 may include a grip surface on the top side to facilitate handling of the carpentry tool 100.

The first receiver 106 and the second receiver 108 may be configured to automatically align the fastener 151 with the stud 145 when the carpentry tool 100 is positioned over the plate 140 and the end of the stud 145 is received in the first receiver 106. A leveling device 121 may be configured to indicate alignment of the plate 140 relative to the stud 145 during a fastening operation. A marker 111 may provide visual guidance for placement of the end of the stud relative to the plate.

Figure 8:
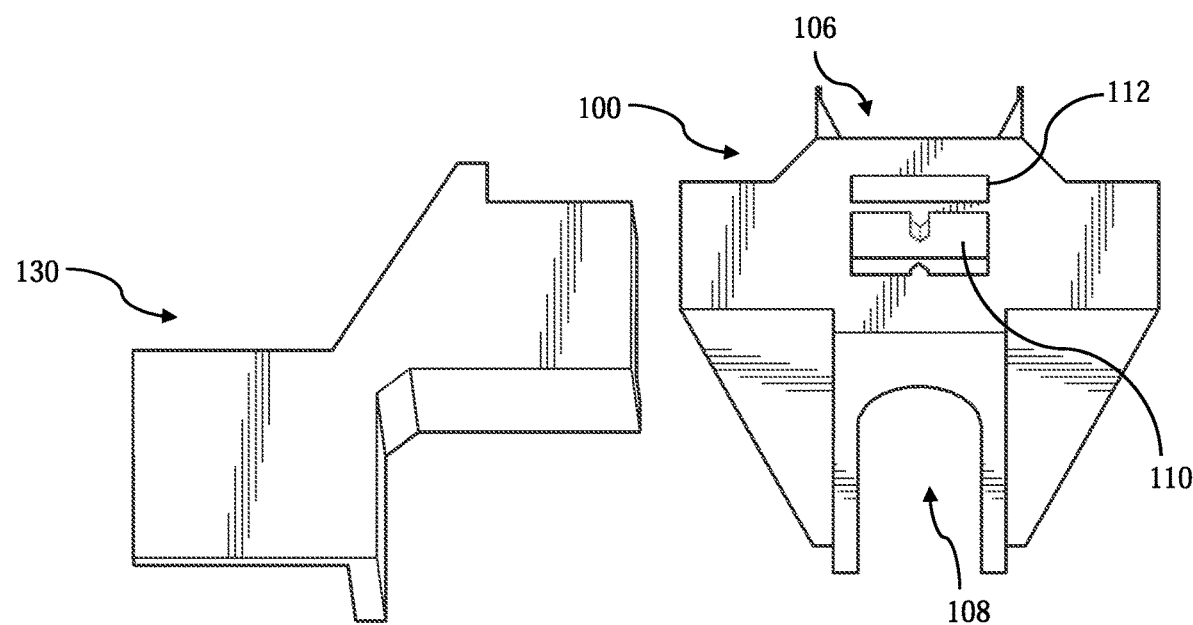
FIG. 8 is a top plan view illustrating a tape measure holder and a carpentry tool, according to an embodiment of the present disclosure.
Figure 9:
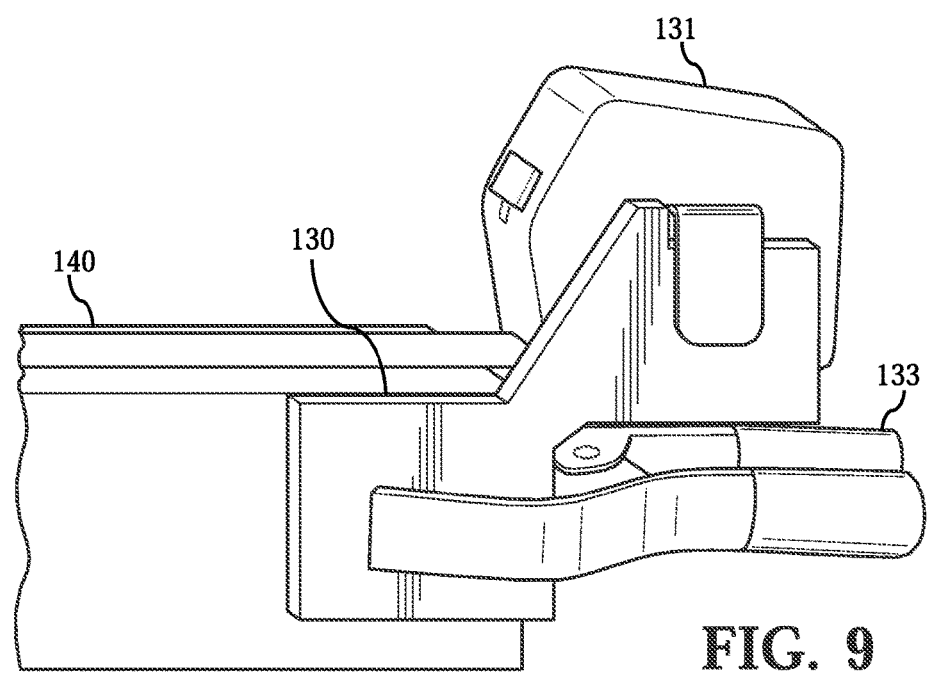
FIG. 9 is a perspective view illustrating a tape measure coupled to a plate with the tape measure holder of FIG. 8, according to an embodiment of the present disclosure.
Figure 10:
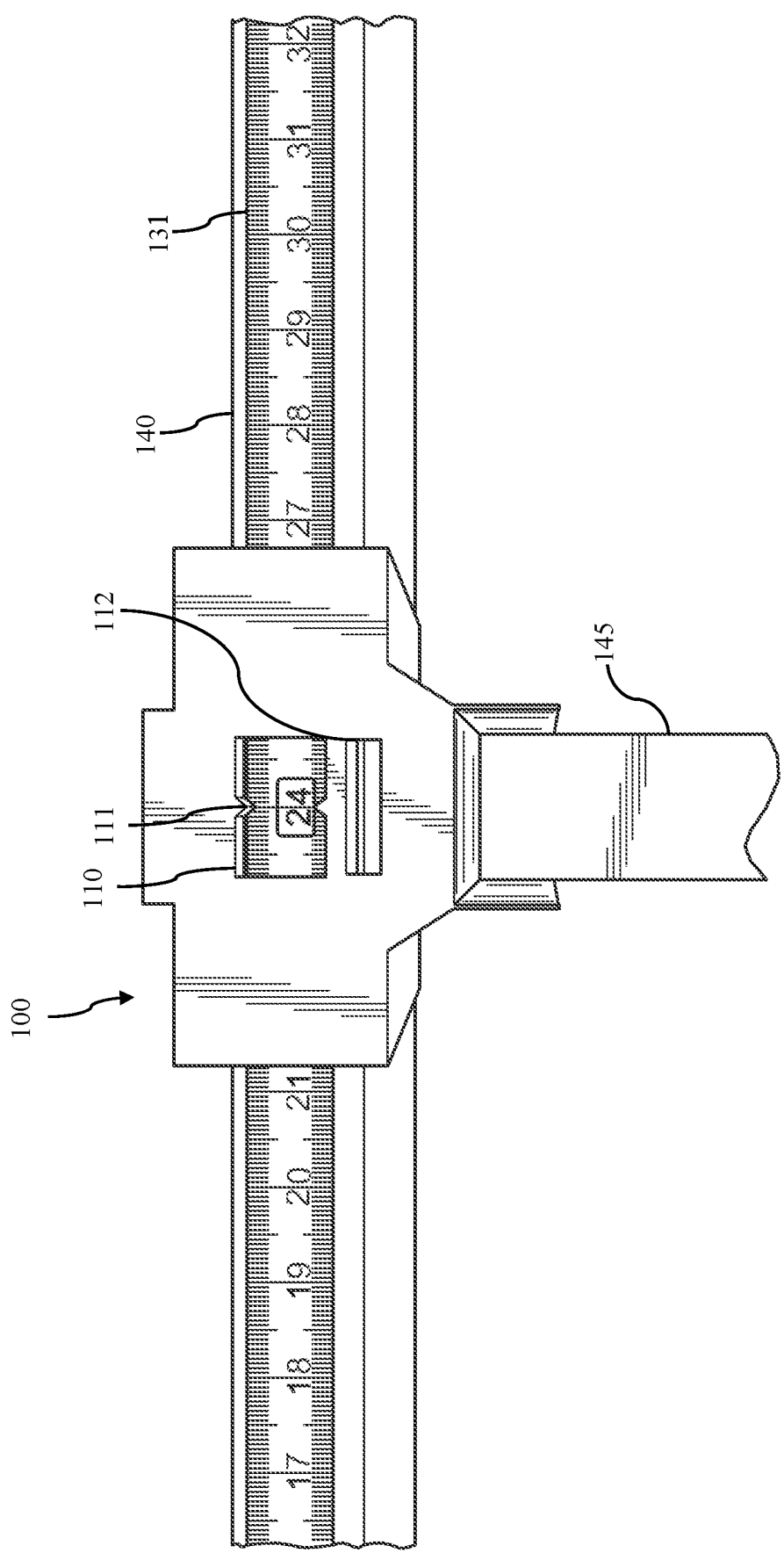
FIG. 10 is a carpentry tool coupled with a plate, a stud, and a tape measure, according to an embodiment of the present disclosure.

As shown in FIGS. 8 and 9, in certain embodiments, a tape measure holder 130 or tape rule holder may be used to fasten a tape measure 131 to the plate 140 to align the tape measure 131 along the plate 140 for viewing with the carpentry tool 100. For example, such as shown in FIG. 10, the tape measure 131 may be placed on the plate 140 and the carpentry tool 100 may be moved along the plate 140 relative with the tape measure 131 such that an accurate placement of the stud 145 may be viewed through the opening 110 and aligned with the marker 111. The carpentry tool 100 may be slid and/or otherwise shifted and moved along the plate 140 to fasten a stud 145 to the plate 140 at an appropriately desired distance and location.

Figure 11:
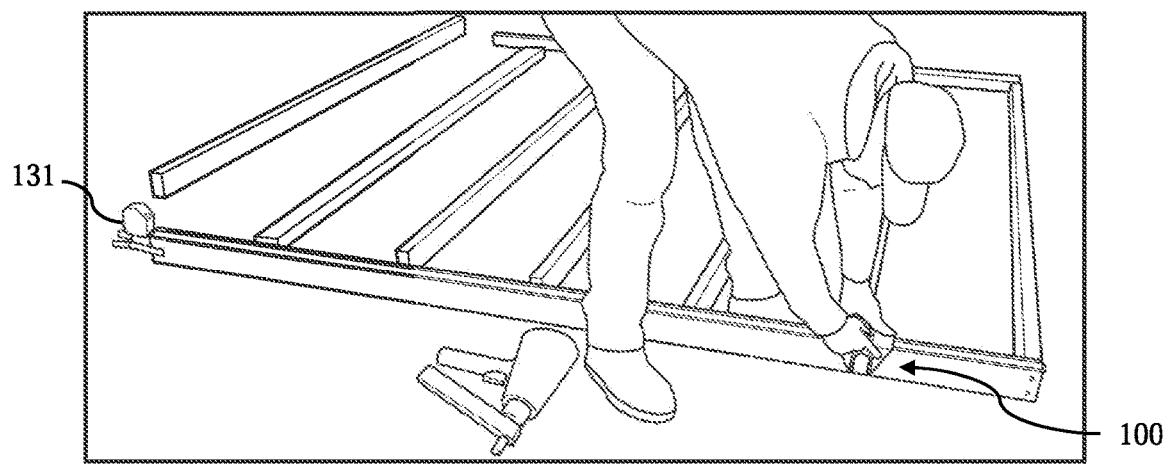
FIGS. 11-13 are a series of drawings showing aspects of a method of operating a carpentry tool, including positioning a carpentry tool over a plate, inserting a fastener, disposing an end of a second stud in a first receiver of the carpentry tool, and performing a fastening operation.
Figure 12:
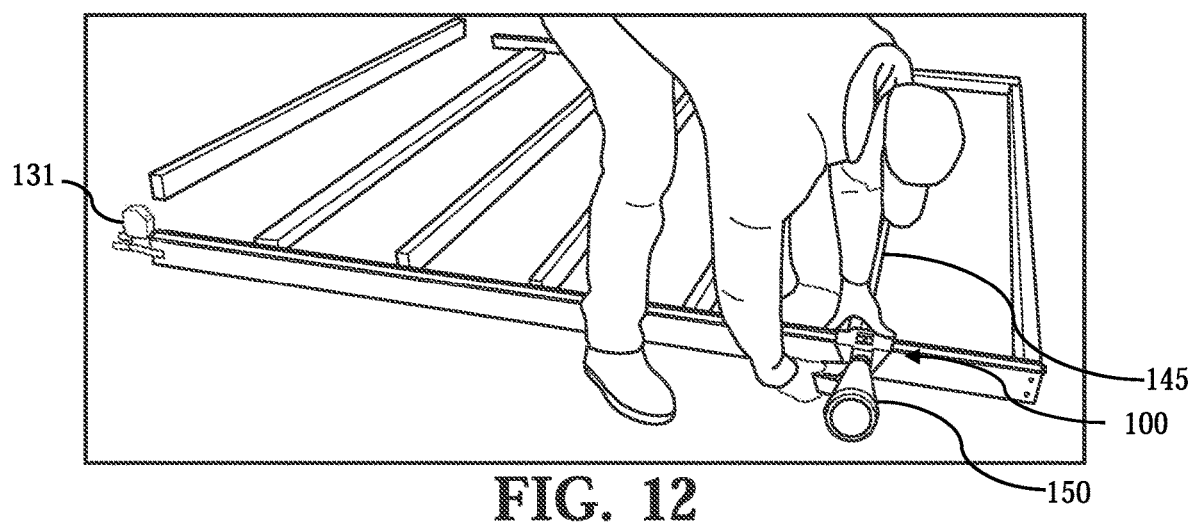
Figure 13:
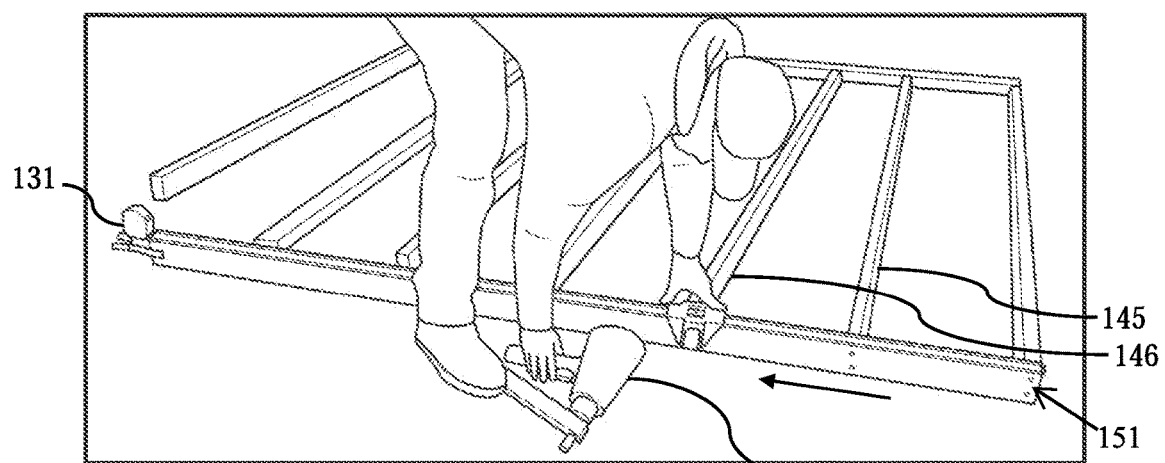

In particular, as shown in FIGS. 11-13, a stud 145 may be positioned along the plate 140 at predetermined distance and nailed or otherwise fastened to the plate 140 with the fastening tool 150. For example, as shown in FIGS. 11 and 12, the stud 145 may be aligned relative to the plate 140 with the carpentry tool 100, and a stud 145 may be fastened in place with the fastening tool 150. Then, the carpentry tool 100 may be moved along the plate 140 to align an additional stud 146, as shown in FIG. 13, to continue the framing operation. A stud retention mechanism 116 may temporarily hold the stud 145 in place during the fastening operation.

Figure 14:
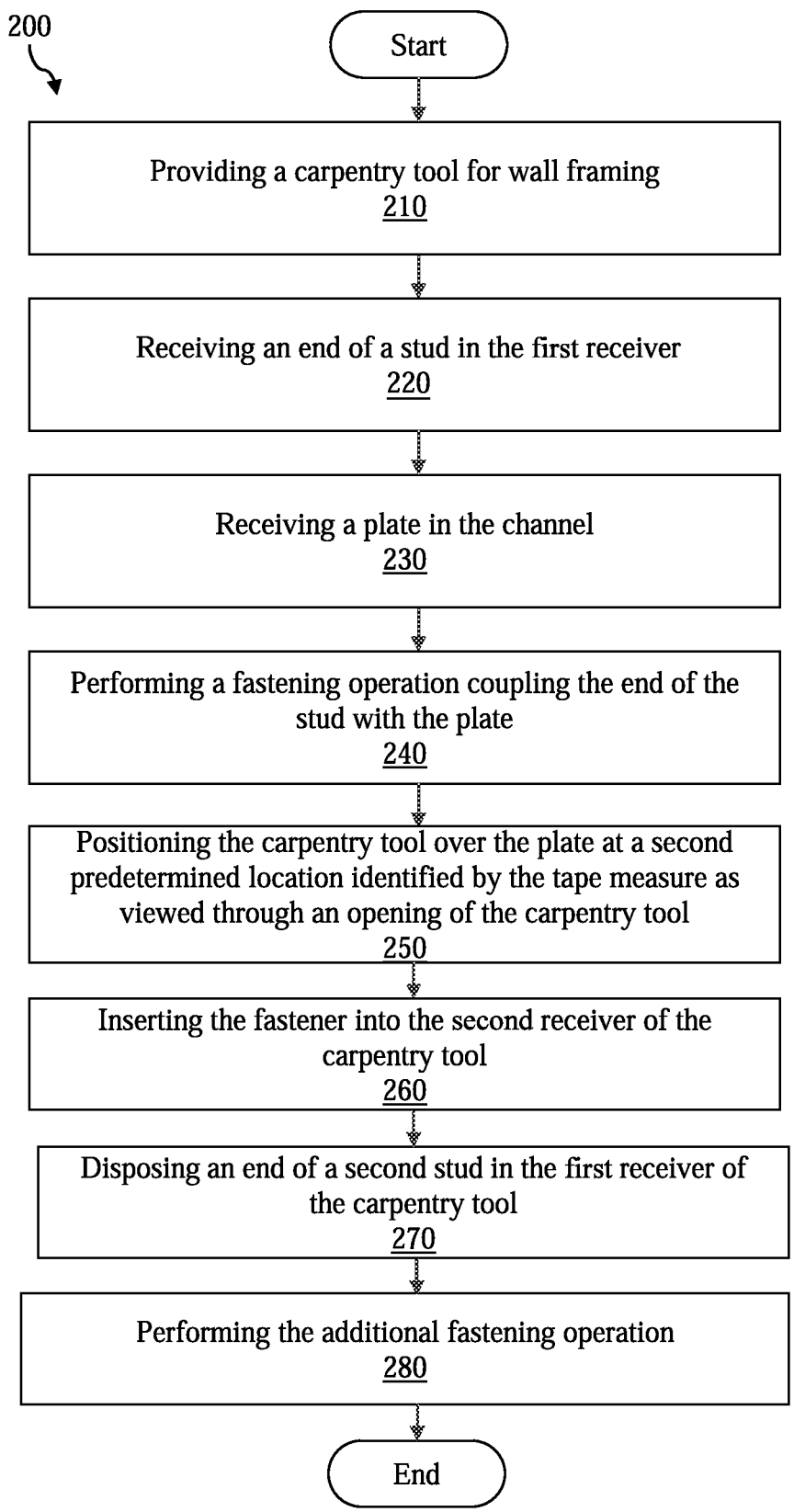
FIG. 14 is a flowchart illustrating a method for wall framing using a carpentry tool, according to an embodiment of the present disclosure.

FIG. 14 is a flowchart illustrating aspects of a method 200 for wall framing using a carpentry tool 100, such as described herein and in accordance with certain embodiments of the present disclosure. The method 200 may allow a user to frame a wall using the carpentry tool 100. For example, at step 210, a carpentry tool 100 may be provided. The carpentry tool 100 may include the carpentry tool 100, such as described herein. In step 220, an end of a stud 145 may be received in the first receiver 106. Then, in step 230, a plate 140 may be received in the channel 107, and in step 240 a fastening operation may be performed in order to couple and otherwise attach an end of the stud 145 with the plate 140.

In certain embodiments, the method 200 may further include step 250 of positioning the carpentry tool 100 over the plate 140 at a second predetermined location identified by the tape measure 131 and as viewed through the opening 110 of the carpentry tool 100. Then, in step 260, the fastener 151 may be inserted into the second receiver 108 of the carpentry tool 100. In step 270, an end of a second and or additional stud 146 may be disposed in the first receiver 106 of the carpentry tool 100 after it has been moved to an additional location of the plate 140. Then, in step 280, the additional stud 146 may be fastened to the plate 140. The fastening operation may be continued along the plate 140 with a stud 145 along the plate 140 at appropriately predetermined positions as desired.

In certain embodiments, prior to receiving the plate 140 in the channel 107, a tape measure 131 may be disposed on the plate 140. The method 200 may also include placing or disposing the tape measure 131 on the plate 140 and positioning the carpentry tool 100 over the plate 140 at a first predetermined location identified by the tape measure 131 as viewed through the opening 110. After receiving the plate 140 in the channel 107, the method 200 may include disposing the end of the stud 145 in the first receiver 106 of the carpentry tool 100 and performing a fastening operation, where the stud 145 may be fastened to the plate 140 with the fastener 151 to form at least a portion of a wall frame. In certain embodiments, performing the fastening operation may include coupling the end of the stud 145 with the plate 140 including inserting the fastener 151 into the second receiver 108 of the carpentry tool 100.

At further steps, the method 200 may include positioning the carpentry tool over the plate 140 at a second predetermined location identified by the tape measure 131 as viewed through the opening 110 of the carpentry tool 100. A fastener 151 may be inserted into the second receiver 108 of the carpentry tool 100 and a second and/or additional stud 146 may be disposed in the first receiver 106 of the carpentry tool 100 before performing a fastening operation, whereby the second and/or additional stud 146 is fastened to the plate 140 with the fastener 151 to form at least a second portion of the wall frame.

EXAMPLES

Example embodiments of the present technology are provided with reference to the several figures enclosed herewith. Example embodiments are particularly described herein below.

Use Case: Standard Wall Framing

In certain embodiments, a construction worker may be tasked with building a wall frame using 2×4 or 2×6 plates. The worker may use the carpentry tool 100 to streamline the process by placing the tool over a plate 140, which may be already laid out with a tape measure 131. The channel 107 may receive the plate 140, and the plurality of holders 120 may help secure the carpentry tool 100 over the tape measure 131. A worker may then view the tape measure 131 through the opening 110 in the carpentry tool 100 to identify a precise location for the stud 145 along the plate 140. Once the location is determined, the worker may insert a fastener 151 into the second receiver 108 and place an end of the stud 145 into the first receiver 106. Using a fastening tool 150 aligned with the second receiver 108, a worker may fasten the stud 145 to the plate 140, to ensure an accurate and secure construction of the wall frame.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A carpentry tool for wall framing, the carpentry tool configured for use with a plate, a stud having an end, a tape measure, a fastening tool, and a fastener, the carpentry tool comprising:
   a top side, a bottom side, a first end with a first receiver, and a second end with a second receiver, the first receiver and the second receiver aligned along a first axis, the first receiver configured to receive the end of the stud and second receiver configured to align the fastening tool and the fastener; and
   a channel formed in the bottom side and aligned along a second axis, the second axis being orthogonal with the first axis, the channel configured to receive the plate.

2. The carpentry tool of claim 1, further comprising a pair of holders disposed within the channel, wherein the pair of holders is configured to hold the carpentry tool over the tape measure when the tape measure is disposed on the plate and the plate is received in the channel.

3. The carpentry tool of claim 2, further comprising an opening formed from the top side to the bottom side and between the first end and the second end, the opening configured to provide a view of a portion of the tape measure therethrough when the tape measure is disposed on the plate.

4. The carpentry tool of claim 1, wherein the plate includes one of a 2×4 plate, a 2×6 plate, a 2×8 plate, and a 2×10 plate.

5. The carpentry tool of claim 2, wherein the first side and the second side are adjustable to change a width of the channel to accommodate a variety of sizes of the plate.

6. The carpentry tool of claim 3, wherein the opening has an opening width and the tape measure has a tape measure width, and the opening width includes a width greater than or equal to the tape measure width to permit concurrent viewing of the tape measure and a portion of the plate adjacent to the tape measure through the opening when the tape measure is disposed on the plate and the plate is received in the channel.

7. The carpentry tool of claim 3, further comprising an opening marker projecting into the opening at the top side to facilitate alignment of the carpentry tool with a center of the stud with reference to the tape measure when the end of the stud is received in the first receiver.

8. The carpentry tool of claim 1, wherein the second receiver is configured to receive and guide a nail gun as the fastening tool during a fastening operation coupling the stud with the plate.

9. The carpentry tool of claim 8, wherein the first receiver includes a stud retention mechanism to temporarily hold the stud in place during the fastening operation.

10. The carpentry tool of claim 2, wherein the pair of holders are configured to engage with the tape measure to prevent slippage during a fastening operation coupling the end of the stud with the plate.

11. The carpentry tool of claim 1, wherein the first receiver and the second receiver are configured to automatically align the fastener with the stud when the carpentry tool is positioned over the plate and the end of the stud is received in the first receiver.

12. The carpentry tool of claim 1, further comprising a leveling device configured to indicate alignment of the plate relative to the stud during a fastening operation.

13. The carpentry tool of claim 1, further comprising a measurement indicator along the first axis to provide visual guidance for placement of the end of the stud relative to the plate.

14. The carpentry tool of claim 1, further comprising:
   a pair of holders disposed within the channel, wherein the pair of holders is configured to hold the carpentry tool over the tape measure when the tape measure is disposed on the plate and the plate is received in the channel, wherein the pair of holders are configured to engage with the tape measure to prevent slippage during a fastening operation coupling the end of the stud with the plate,
   an opening formed from the top side to the bottom side and between the first end and the second end, the opening configured to provide a view of a portion of the tape measure therethrough when the tape measure is disposed on the plate,
   wherein the opening has an opening width, and the tape measure has a tape measure width, and the opening width includes a width greater than or equal to the tape measure width to permit concurrent viewing of the tape measure and a portion of the plate adjacent to the tape measure through the opening when the tape measure is disposed on the plate and the plate is received in the channel, and
   an opening marker projecting into the opening at the top side to facilitate alignment of the carpentry tool with a center of the stud with reference to the tape measure when the end of the stud is received in the first receiver.

15. A method for wall framing using a carpentry tool, the method comprising:
   providing a carpentry tool for wall framing according to claim 1;
   receiving an end of a stud in the first receiver;
   receiving a plate in the channel; and
   performing a fastening operation coupling the end of the stud with the plate.

16. The method of claim 15, wherein prior to receiving the plate in the channel, disposing a tape measure on the plate.

17. The method of claim 16, further comprising placing the tape measure on the plate and positioning the carpentry tool over the plate at a first predetermined location identified by the tape measure as viewed through an opening.

18. The method of claim 17, wherein after receiving the plate in the channel, disposing the end of the stud in the first receiver of the carpentry tool, and performing a fastening operation, whereby the stud is fastened to the plate with the fastener to form at least a portion of a wall frame.

19. The method of claim 15, wherein performing a fastening operation coupling the end of the stud with the plate includes inserting the fastener into the second receiver of the carpentry tool.

20. The method of claim 15 further comprising:
positioning the carpentry tool over the plate at a second predetermined location identified by the tape measure as viewed through an opening of the carpentry tool;
inserting the fastener into the second receiver of the carpentry tool;
disposing an end of a second stud in the first receiver of the carpentry tool; and
performing the fastening operation, whereby the second stud is fastened to the plate with the fastener to form at least a second portion of a wall frame.

* * * * *